(12) United States Patent
Marshall et al.

(10) Patent No.: US 7,257,220 B1
(45) Date of Patent: Aug. 14, 2007

(54) METHOD AND SYSTEM FOR PROVIDING EXTENDED REACH OF A DIGITAL SUBSCRIBER LINE SIGNAL

(75) Inventors: Robert A. Marshall, Georgetown, TX (US); Michael H. Capon, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 547 days.

(21) Appl. No.: 09/751,756

(22) Filed: Dec. 29, 2000
(Under 37 CFR 1.47)

(51) Int. Cl.
*H04M 1/00* (2006.01)
*H04M 3/00* (2006.01)
*H04M 7/00* (2006.01)

(52) U.S. Cl. .................................. 379/339
(58) Field of Classification Search ................ 375/211, 375/214; 379/338, 339, 342, 344, 345, 347
See application file for complete search history.

(56) References Cited

U.S. PATENT DOCUMENTS

| | | | | |
|---|---|---|---|---|
| 4,701,935 A | * | 10/1987 | Namiki | 375/214 |
| 4,878,232 A | * | 10/1989 | Fisher | 375/362 |
| 6,088,385 A | * | 7/2000 | Liu | 375/219 |
| 6,236,664 B1 | * | 5/2001 | Erreygers | 370/492 |
| 6,418,161 B1 | * | 7/2002 | Shively et al. | 375/222 |
| 6,519,291 B1 | | 2/2003 | Dagdeviren et al. | 375/260 |
| 6,625,116 B1 | * | 9/2003 | Schneider et al. | 370/226 |
| 6,658,049 B1 | * | 12/2003 | McGhee et al. | 375/211 |
| 6,674,810 B1 | * | 1/2004 | Cheng | 375/296 |
| 6,731,678 B1 | * | 5/2004 | White et al. | 375/219 |
| 6,754,233 B1 | | 6/2004 | Henderson et al. | 370/493 |
| 6,760,383 B1 | | 7/2004 | Darveau | 375/259 |
| 6,763,097 B1 | | 7/2004 | Vitenberg | 379/93.31 |
| 6,765,989 B1 | | 7/2004 | Murphy et al. | 379/22.08 |
| 6,879,625 B1 | * | 4/2005 | Levonas et al. | 375/211 |
| 7,142,619 B2 | * | 11/2006 | Sommer et al. | 375/345 |

* cited by examiner

*Primary Examiner*—Curtis Kuntz
*Assistant Examiner*—Alexander Jamal
(74) *Attorney, Agent, or Firm*—Baker Botts L.L.P.

(57) ABSTRACT

A method for providing extended reach of a digital subscriber line signal includes receiving an incoming DSL signal, splitting the DSL signal into separate voice and data signals, demodulating the data signal, requantizing the demodulated data signal, modulating the requantized data signal, amplifying the modulated requantized data signal and the voice signal, combining the amplified voice and data signal into a combined signal, and transmitting the combined signal.

21 Claims, 3 Drawing Sheets

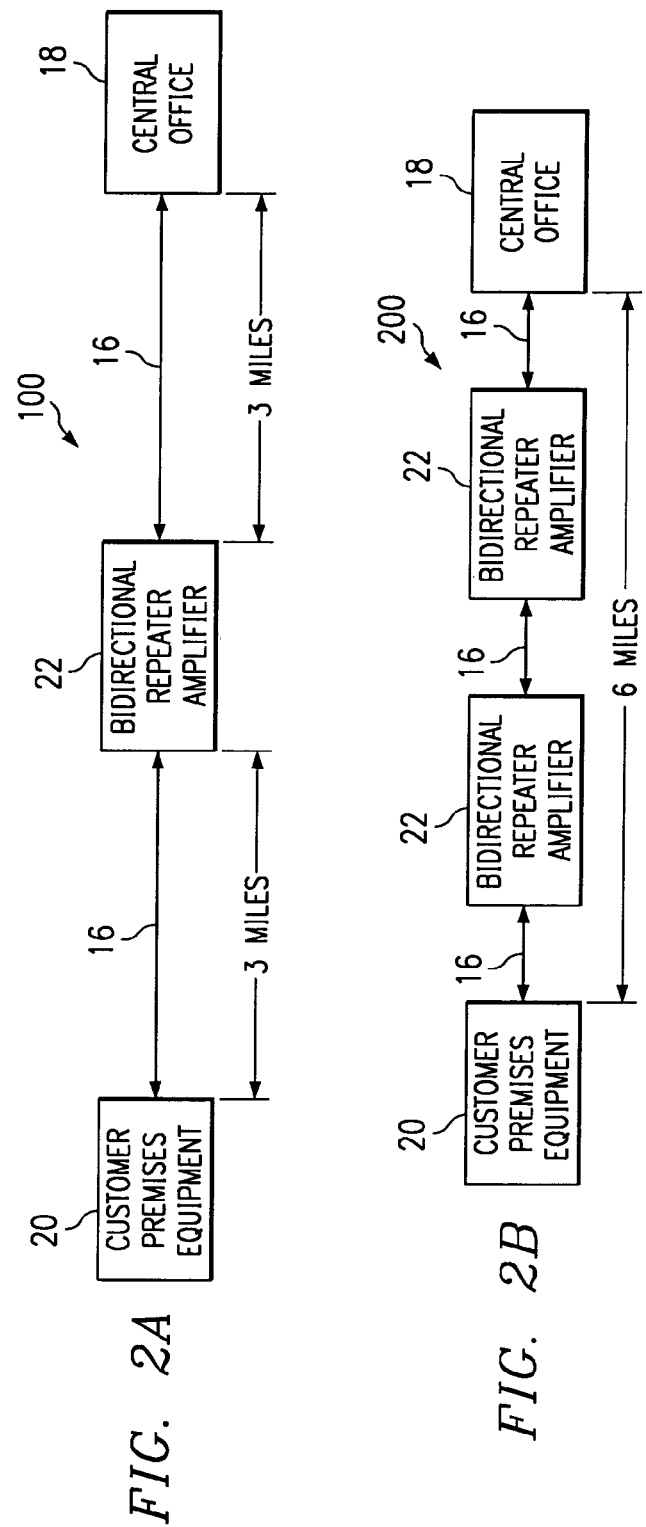
FIG. 2A
FIG. 2B
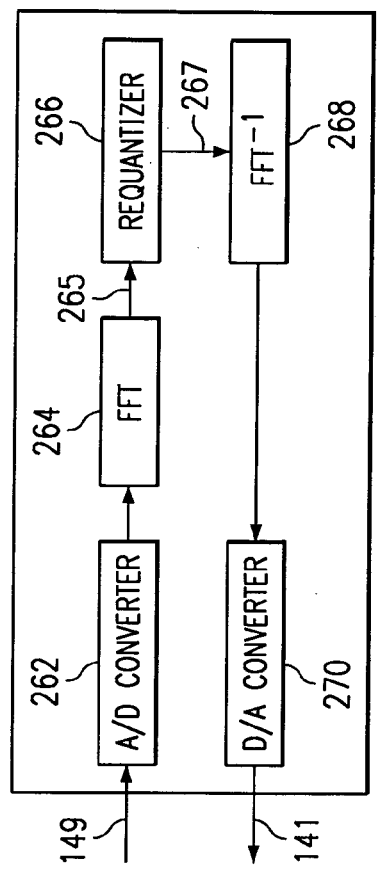
FIG. 5

METHOD AND SYSTEM FOR PROVIDING EXTENDED REACH OF A DIGITAL SUBSCRIBER LINE SIGNAL

TECHNICAL FIELD OF THE INVENTION

This invention relates generally to data communications and more particularly to a method and system for extending the reach of a digital subscriber line signal.

BACKGROUND OF THE INVENTION

Data communication is becoming increasingly important in today's society. For example, the popularity of the Internet has expanded demand for high quality, high speed access to a variety of services available on the Internet. Although infrastructure enabling such data communication allows transmission of data at high speeds over large distances, a barrier remains to providing high quality, high speed data communications. Communicating data between a home user or a business and a central office of a service provider requires either utilizing existing communications lines, such a phone lines, between the service provider and the home for a business user, or adding additional infrastructure, usually at significant expense.

Digital subscriber line (DSL) technology addresses the problem of connecting the central office of a service provider to a home user or business by utilizing a frequency spectrum available on existing telephone lines for data that is not used for voice traffic. The frequencies at which data are transmitted and received according to DSL technology are higher than the frequency spectrum used for voice traffic on a standard telephone line. Asynchronous digital subscriber line (ADSL) technology is a particular form of DSL. With ADSL, a different data rate is used for upstream transmission of data than is used for downstream reception of data.

DSL technology uses one of a number of technologies to encode and decode data on a single carrier frequency. These technologies include (1) a quadrature amplitude modulation (QAM), (2) carrierless amplitude and phase (CAP) modulation, and (3) discrete multi-tone (DMT) modulation. Quadrature amplitude modulation is a modulation technique using variations in signal amplitude. This modulation technique encodes data as discrete phase plus amplitude changes of a carrier tone. Carrierless amplitude and phase modulation is a modulation technique that allows multiple bits of information to be represented by a single frequency cycle. Discrete multi-tone modulation is a modulation technique that separates the frequency range in which data is transmitted and received into a plurality of frequency bands or channels, using a Fast Fourier Transform.

A problem that arises with the use of DSL technology is as distance between the central office and a user increases, the available bandwidth, and therefore, transmission rates decrease. Two reasons for this are (1) attenuation along the telephone wire, and (2) cross talk and other noise sources. Generally, the effective reach of a DSL signal over existing telephone lines is approximately three miles from the central office. Thus, a user of a DSL line must be located within three miles of the associated central office. This hinders the widespread deployment of DSL technology.

SUMMARY OF THE INVENTION

Therefore, a need has arisen for an improved method and system for extending the reach of a digital subscriber line signal. The present invention provides a system and method for extending the reach of a digital subscriber line signal.

According to one embodiment of the invention, a method for providing greater reach of a DSL signal includes receiving an incoming DSL signal having a data signal, demodulating the data signal, requantizing the demodulated data signal, modulating the requantized data signal, amplifying the modulated requantized data signal, and transmitting the amplified signal.

According to another embodiment of the invention, a bi-directional DSL repeater and amplifier includes a first signal detector operable to receive a first incoming DSL signal including a first data signal and direct the first incoming DSL signal to a first conditioning circuit and also operable to receive a first outgoing data signal from a second conditioning circuit and direct the first outgoing data signal over a first telephone line. The bi-directional DSL repeater and amplifier also includes a first conditioning circuit. The first conditioning circuit is operable to receive a signal indicative of the first incoming DSL signal, demodulate, requantize, and remodulate the first data signal to produce a first remodulated data signal, and amplify the first remodulated data signal to produce a second outgoing data signal. The second conditioning circuit is operable to receive a signal indicative of a second incoming DSL signal including a second data signal, demodulate, requantize, and remodulate the second data signal to produce a second remodulated data signal, and amplify the second remodulated data signal to produce the first outgoing data signal. The bi-directional DSL repeater and amplifier also includes a second signal detector operable to receive the second incoming DSL signal and direct the second incoming DSL signal to the second conditioning circuit and also operable to receive the second outgoing data signal from the first conditioning circuit and direct the second outgoing data signal over a second telephone line.

Embodiments of the invention provide numerous technical advantages. For example, in one embodiment of the invention, a method is provided that substantially increases the reach of a digital subscriber line signal. By extending the reach of a digital subscriber line signal, widespread deployment of digital subscriber line technology may be effected because a user will no longer have to reside within approximately three miles of the central office.

Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which:

FIG. 2a is block diagram showing a system for extending the reach of a DSL signal according to the teachings of the invention;

FIG. 2b is a block diagram of a system showing a system for extending the reach of a DSL signal according to another embodiment of the invention;

FIG. 5 is a block diagram of the data acquirer and re-transmitter of FIG. 4 according to one embodiment of the invention.

DETAILED DESCRIPTION OF THE INVENTION

Embodiments of the present invention and its advantages are best understood by referring to FIGS. 1 through 5 of the drawings, like numerals being used for like and corresponding parts of the various drawings.

Figure 1:
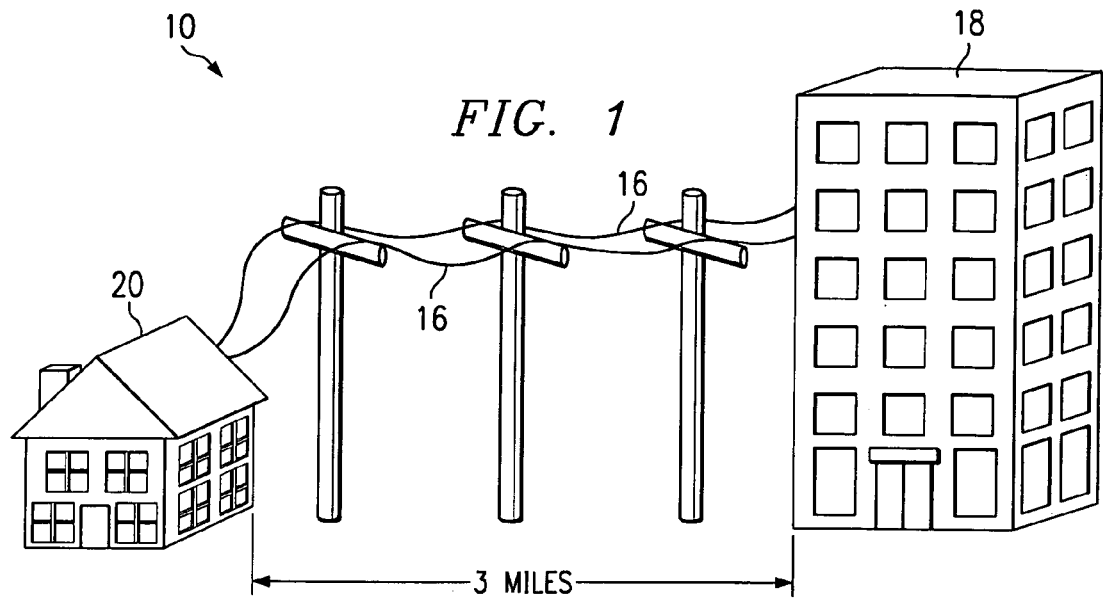
FIG. 1 is a schematic diagram showing the connection of a home user to a central office through a plurality of telephone lines.

FIG. 1 is a block diagram of a system 10 for providing a DSL signal from a central office 18 to a customer's premises 20. A DSL signal travels over telephone lines 16, utilizing higher frequencies for data signals than those used for voice signals. As described above, one problem associated with digital subscriber line technology is that the data signal degrades over the telephone line 16. This occurs both because of attenuation on telephone line 16 especially at higher frequencies and due to crosstalk between adjacent telephone wires 16. Due to this degradation the maximum distance between the customer's premises 20 and a central office for customary implementations of digital subscriber line technology is approximately three miles.

According to the teachings of the invention, this distance is increased by providing a repeater and amplifier that collects and retransmits a digital subscriber line signal at various points between central office 18 and the customer premises 20. Details of example embodiments of a method and system for extending the reach of such a DSL signal are described in conjunction with FIGS. 2A through 6.

FIG. 2A is a block diagram of a system 100 for extending the reach of a DSL signal according to the teachings of the invention, and FIG. 2B is a block diagram of a system 200 for extending the reach of a DSL signal according to another embodiment of the invention. As shown, bi-directional repeater amplifier 22 is placed between customer premises 20 and the central office 18. This allows extension of the reach of the DSL signal by approximately another three miles.

FIG. 2B shows a plurality of bi-directional repeater amplifiers 22 used to extend the reach of a DSL signal. In this example, customer premises 20 may be located approximately 6 miles from central office 18, but decreased spacing is utilized between the bi-directional repeater amplifiers to provide a higher data transmission rate.

Figure 3:
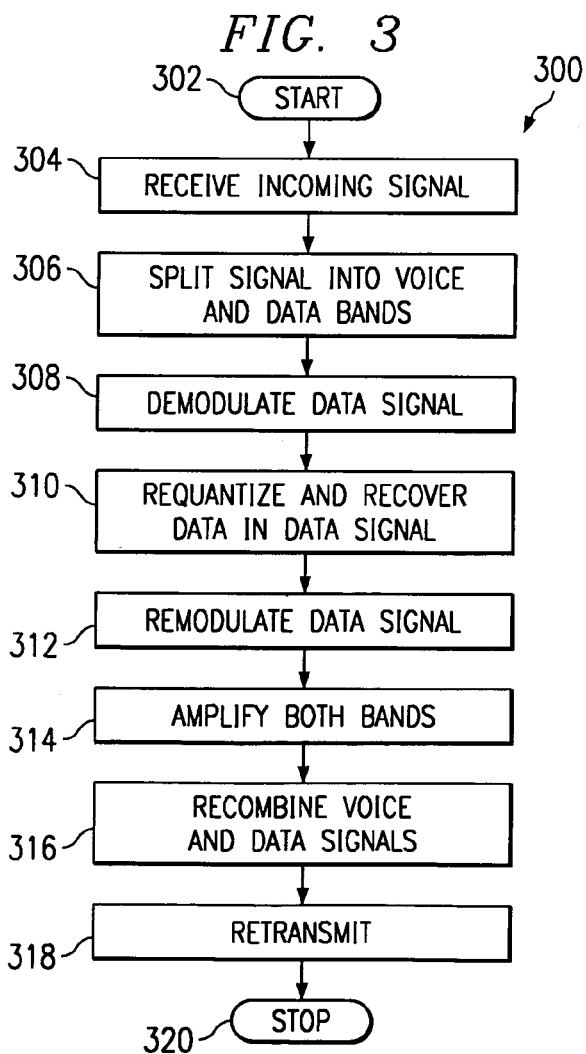
FIG. 3 is flow chart showing a method for extending the reach of a DSL signal according to one embodiment of the invention.

FIG. 3 is a flowchart illustrating an example method for extending the reach of a DSL signal. The method begins at step 302. At step 304 an incoming signal is received over telephone lines 16. According to one embodiment of the invention, suitable circuitry is utilized such that the reach of both upstream and downstream signals are extended. In such an embodiment, step 304 of receiving the signal may include an additional step of determining whether the signal is upstream or downstream and transmitting it in an appropriate direction to suitable circuitry for processing.

At a step 306, a received signal that requires amplification is split into voice and data bands. As described above, a DSL signal may comprise a voice band of zero to approximately 4 kilohertz and a data band of approximately 25 kilohertz to 1.1 megahertz for transmission of data signals. Alternatively, a DSL signal may include only data with no voice signal. In such a case, step 306 is not utilized.

Certain forms of DSL discriminate between upstream and downstream transmissions. For example, according to ADSL, the frequency range of approximately 25 kilohertz to 271 kilohertz is utilized for upstream transmissions and the frequency range of approximately 271 kilohertz to 1.1 megahertz is utilized for downstream transmissions.

Once the DSL signal is split into voice and data bands, the data signal is conditioned to acquire underlying data and to transmit it in a regenerated form. Such a procedure contrasts with simply amplifying the DSL signal at this point in that such amplification will also amplify any associated noise, resulting in poor signal quality. Such signal conditioning is performed by steps 308, 310, and 312.

At step 308, the data signal is demodulated. According to one embodiment, such demodulation may include converting the data signal from analog format to digital format and performing a Fast Fourier Transform on the digital signal to form a plurality of frequency bands of data.

At a step 310, the demodulated data signal is recovered. Recovery of the demodulated data signal refers to determining true values for each of the data bits stored in the plurality of data bins. According to one embodiment, this step involves determining a constellation that is associated with each bit and setting the value of the bit to the ideal value of the constellation. This step may also be referred to as requantization.

At a step 312, requantized data is remodulated. Such remodulation may include an Inverse Fast Fourier Transform to produce a digital signal in the time domain rather than the requantized data generated at step 310, which is in the frequency domain. In addition, the resulting digital signal in the time domain may be converted to analog form for subsequent amplification.

At step 314, the remodulated analog signal representing the data of the DSL signal is amplified. In addition, the voice signal split out at step 306 is also amplified. The amount of amplification is a function of the amount of loss that occurs over telephone lines 16 and the associated circuitry, such as the signal director described below.

At step 316, the amplified voice and data signals are recombined into a single data signal. This combination step may also include amplifying the combined signal.

At step 318, the recombined and amplified voice and data signals are retransmitted along telephone lines 16 to customer premises 20, central office 18, or another bi-directional repeater amplifier 22.

The method concludes at step 320.

Thus, according to the teachings of the invention, the reach of a DSL signal may be extended by acquiring the underlying data signal by determining the true values associated with that data signal and then requantizing that data for subsequent amplification and re-transmittal. By extending the reach of the DSL signal, widespread use of DSL technology may be deployed, allowing remote areas that heretofore have not had access to such technology to benefit from it. The method of FIG. 3 may be implemented in many forms. Examples of such implementation are described in FIGS. 4 through 5.

Figure 4:
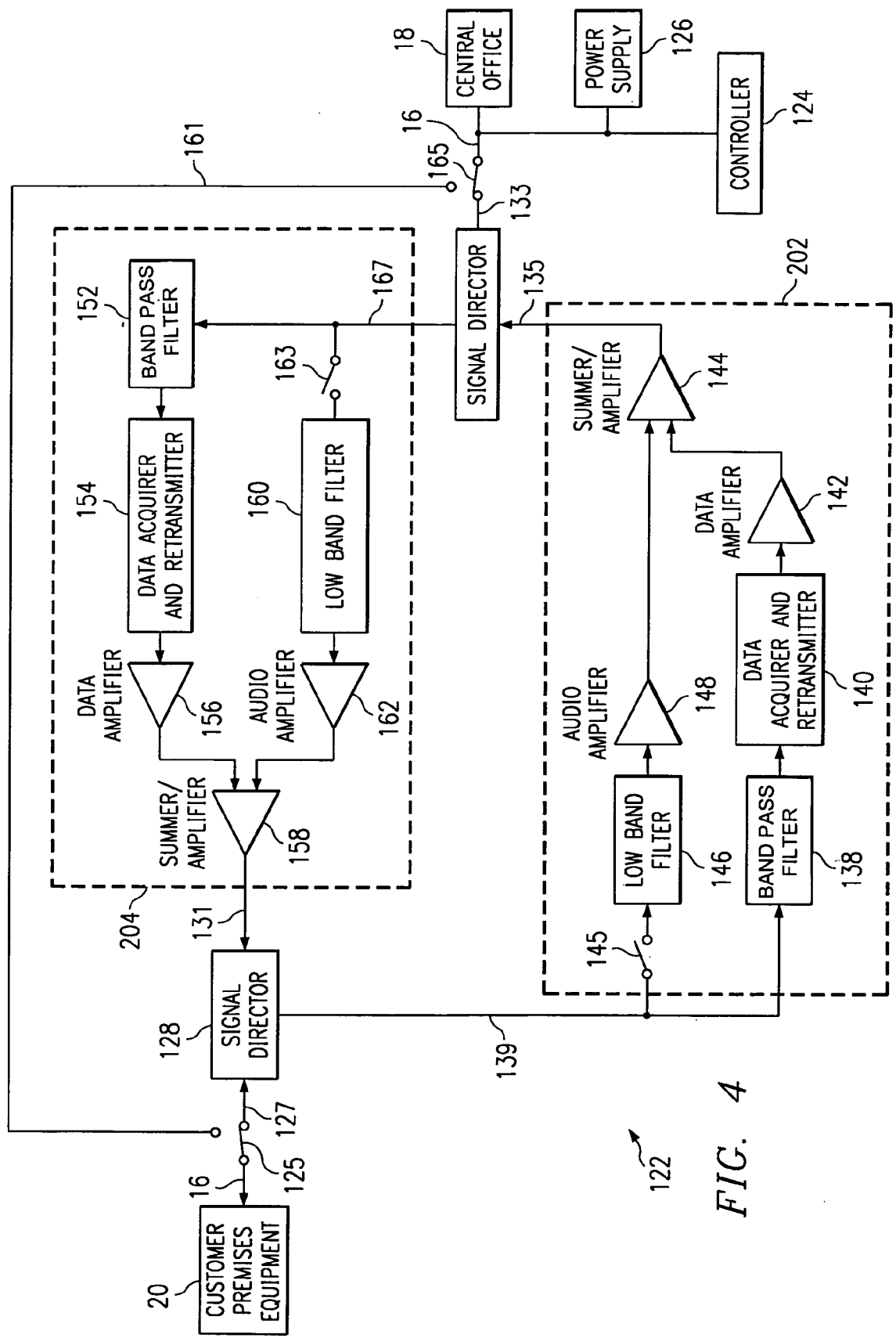
FIG. 4 is block diagram of the bi-directional repeater amplifier of FIGS. 2a and 2b according to one embodiment of the invention.

FIG. 4 is a circuit diagram of one implementation of bi-directional repeater amplifier 22. In this example, either an upstream or a downstream DSL signal may be received by bi-directional repeater amplifier 122 and that signal is transmitted according to the teachings of the invention in the appropriate direction.

Bi-directional repeater amplifier 122 comprises a pair of signal directors 128, 130. Signal director 128 receives an upstream signal 127 sent from customer premises 20 along lines 16 and directs signal 127 to a conditioning circuit 202 as signal 139. Signal director 128 also receives a downstream signal 131, which has been amplified according to the teachings of the invention, and directs signal 131 toward customer premises 20 along line 16. Thus, signal director 128 directs incoming and outgoing signals appropriately along telephone lines 16. Signal director 130 operates similarly, receiving a downstream signal 133 and also receiving an amplified signal 135 and directs these signals appropriately.

In this example, signal directors 128, 130 are balanced bridges. However, signal directors 128, 130 may be formed by a variety of circuits operable to receive signals in two directions and to direct them along the appropriate path, including a resistance bridge, transformer or other hybrid circuit.

Bi-directional repeater amplifier 122 may also include a pair of switches 125 and 165 to disable operation of the bi-directional receiver amplifier 122. Use of a fail-safe mode associated with repeater 122 allowing voice transmissions or reduced data rate transmissions may be incorporated. Such a fail-safe mode would deactivate the repeater 122 and switch it out of line using switches 125 and 165.

Also associated with bi-directional receiver amplifier 122 is a controller 124. Controller 124 controls settings associated with functions performed by data acquirer and retransmitter 140 and 154, as described below. Controller 124 may also be used for diagnostic purposes. Bi-directional receiver amplifier 122 also includes a power supply 126 that provides suitable power levels to bi-directional receiver amplifier 122. These power levels may include, in one example, a 5 volt voltage level produced from a 130 volt level at central office 18. In such embodiments, communication of power from central office 18 to power supply 126 may occur over lines separate from telephone lines 16 (not explicitly shown), or in some embodiments, over lines 16, which may result in loss of voice signals over these telephone lines 16.

Once a signal is received at one of the signal directors 128, 130, the signal is directed to one of two conditioning circuits 202, 204. The operation of each of the conditioning circuits 202, 204 is substantially the same. Conditioning circuit 202 is described as an example.

Conditioning circuit 202 receives a DSL signal 139, which is substantially similar to signal 127. DSL signal 139 is received by conditioning circuit 202 and a regenerated version of that signal is produced as signal 135 by conditioning circuit 202. According to the teachings of the invention, signal 135 is an amplified version of the DSL signal 139, but it more accurately reflects the original underlining data. According to this embodiment, conditioning circuit 202, generally, filters DSL signal 139, demodulates, requantizes, remodulates the data signal, and amplifies both the voice and data signals before combining the audio and data signals for retransmission at signal 135. In other embodiments, only data is transmitted and amplified, with no associated voice signal. Example circuitry associated with conditioning circuit 202 is described below.

Conditioning circuit 202 includes a switch 145, a low band filter 146, an audio amplifier 148, a band pass filter 138, a data acquirer and re-transmitter 140, a data amplifier 142, and a summer/amplifier 144. Low pass filter 146 and audio amplifier 148 are associated with any voice signal contained in DSL signal 139. High band filter 138, data acquirer and transmitter 140, and data amplifier 142 are associated with the data signal contained within DSL signal 131.

Switch 145 may be open for SDSL operations. With SDSL, only data is transmitted, with no associated voice signal. Therefore, there is no need for amplification of the voice signal. When switch 145 is closed, low pass filter 146 allows passage of the low frequency signals, corresponding to voice signals, of DSL signal 139. According to one embodiment of the invention, the corner frequency for low band filter 146 is four kilohertz.

In this embodiment, band pass filter 138, corresponding to upstream transmissions, allows passage of frequencies between approximately 25 to approximately 272 kilohertz and band pass filter 152, corresponding to downstream transmissions, allows passage of frequencies between approximately 272 kilohertz and 1.1 megahertz; however, other suitable frequency ranges may be used to divide portions of DSL signal 139 as desired. Band pass filter 138 produces a filtered signal 149. Filtered signal 149 is received by data acquirer and re-transmitter 140. Data acquirer and re-transmitter 140 perform a number of functions to produce a requantized signal 141 that is representative of the original data associated with DSL signal 127. Circuitry associated with data acquirer and re-transmitter 140 for performing these functions are described in greater detail in FIG. 5.

Audio amplifier 148 amplifies the low band signal 151 received from low band filter 146 and data amplifier 142 amplifies the requantized high band signal 141. The amount of amplification for both data amplifier 142 and audio amplifier 148 may be determined based upon the amount of loss associated with transmission of the DSL signal over telephone lines 16 and the distance between bi-directional repeater amplifier 122 and the associated central office or customer premises.

The outputs of both data amplifier 142 and audio amplifier 148 are received by summer/amplifier 144. Summer/amplifier 144 combines the amplified audio signal received from audio amplifier 148 and the requantized and amplified data signal received from data amplifier 142 into a single amplified DSL signal 135. Amplified DSL signal 135 is received by signal director 130 and transmitted to central office 18 by signal director 130 as described above.

Thus, according to the teachings of the invention, a DSL signal may be amplified to allow greater reach of the DSL signal.

Conditioning circuit 204 is substantially similar to conditioning circuit 202 and includes a band pass filter 152, a data acquirer and re-transmitter 154, a data amplifier 156, a switch 163, a low band filter 160, an audio amplifier 162, and a summer/amplifier 158. Conditioning circuit 204 operates in substantially the same manner as conditioning circuit 202. As described above, band pass filter 152 may differ somewhat from band pass filter 138 for implementations where DSL data are transferred in different frequency bands depending on whether the transmission is upstream or downstream; however, the principles of splitting the voice and data signals into separate bands are the same.

Additional details of one embodiment data acquirer and re-transmitter 140 and data acquirer and re-transmitter 154 are described below in conjunction with FIG. 5.

FIG. 5 is a block diagram of one example of data acquirer and re-transmitter 140. Data acquirer and re-transmitter 140 includes analog-to-digital converter 262, a Fast Fourier Transformer 264, a requantizer 266, an Inverse Fast Fourier Transformer 268, and a digital-to-analog converter 270. Analog-to-digital converter 262 receives analog data signal 149. Once the signal is converted to digital form, it is provided to Fast Fourier Transformer 264. Fast Fourier Transformer 264 divides the received digital signal into a plurality of frequency ranges and also discards data in undesired frequency ranges. Fast Fourier Transformer 264 may be implemented in software or by suitable circuitry. In one example, a digital signal processor (DSP) is utilized. In this embodiment, for upstream data transmissions, frequency ranges that exceed approximately 272 kilohertz and fall below 25 kilohertz are discarded because these ranges are outside the ranges in which data are transferred according to DSL technology. For downstream transmissions, frequencies outside the range of 272 kilohertz to 1.1 megahertz are discarded.

Fast Fourier Transformer 264 generates appropriate bins of data on line 265 for receipt by requantizer 266. In this embodiment, for upstream transmissions, frequency bins corresponding to bins 5 through 63 commonly used in DMT ADSL technology are generated; for downstream transmissions, frequency bins corresponding to bins 64 through 255 are generated.

Requantizer 266 receives the frequency domain data on line 265 from Fast Fourier Transformer 264. Requantizer 266 determines for each bin received, a symbol associated with the data bit. The symbol refers to one of a discrete number of possible data sequences that the received data could be intended to represent. The active constellations are determined and specified by controller 124. For each bin, requantizer 266 assigns the value of the closest symbol to that bin. Requanitization is performed in the frequency domain. Requantizer 266 generates a frequency domain signal and provides that signal over line 267 to inverse Fast Fourier Transformer 268. This signal on line 267 includes requantized data in bins associated with bins received along line 265. For bins not received along line 265, the associated values are set to zero.

Inverse Fast Fourier Transformer 268 converts the requanitized frequency domain signal to a time domain signal digital signal and provides the time domain digital signal to digital-to-analog converter 270. Inverse Fast Fourier Transformer 268 may be implemented by software or suitable circuitry. In one example, a digital signal processor (DSP) is utilized. Digital-to-analog converter 270 generates analog signal 141 for providing to data amplifier 142, as described above in FIG. 4.

Thus, by requantizing the data associated with DSL signal 129, errors resulting from transmission over long lines are reduced, allowing subsequent amplification of data more representative of the true data values, rather than amplification of associated noise. This allows DSL signals to be retransmitted, resulting in increased reach of DSL signals and more widespread deployment of DSL technology.

Although the present invention and its advantages have been described in detail, it should be understood that various changes, substitutions, and alterations can be made therein without departing from the spirit and scope of the present invention as defined by the appended claims.

What is claimed is:

1. A method for providing greater reach of a DSL signal comprising:
    receiving an incoming DSL signal including a data signal and a voice signal;
    demodulating the data signal;
    requantizing the demodulated data signal by determining a constellation associated with each bit of data in the modulated data signal and resetting the value of that bit to the value of the constellation to acquire underlying data in the data signal and transform the data signal into a regenerated form;
    modulating the requantized data signal;
    combining and amplifying the modulated requantized data signal and the voice signal; and transmitting the amplified signal.

2. The method of claim 1, wherein demodulating the data signal comprises:
    converting the data signal from analog to digital form;
    dividing, by a Fast Fourier Transformer, the data signal in digital form into a plurality of desired data bins specified by frequency; and
    discarding data outside the plurality of desired data bins.

3. The method of claim 1, wherein modulating the requantized data signal comprises combining, by an inverse Fast Fourier Transformer, a plurality of requantized data in a plurality of data bins specified by frequency into a digital signal in the time domain and converting the digital signal in the time domain to an analog signal.

4. The method of claim 1, wherein requantizing the demodulated data signal comprises requantizing the demodulated data signal in the frequency domain.

5. The method of claim 1, further comprising filtering the voice signal into a first frequency range of approximately zero to four kilohertz and filtering the data signal into a second frequency range of approximately 25 kilohertz to 1.1 megahertz.

6. The method of claim 1, wherein receiving the incoming DSL signal comprises receiving, by a resistive hybrid bridge, the incoming DSL signal.

7. The method of claim 1, wherein transmitting the combined signal comprises transmitting, by a balanced bridge, the combined signal.

8. A method for providing greater reach of a DSL signal having a data portion, comprising:
    demodulating the data portion; requantizing the demodulated data portion by determining a constellation associated with each bit of data in the modulated data portion and resetting the value of that bit to the value of the constellation to acquire underlying data in the data portion and transform the data portion into a regenerated form; modulating the requantized data portion;
    combining and amplifying the modulated requantized data portion and a voice portion; and transmitting the amplified modulated requantized data portion.

9. The method of claim 8, wherein demodulating the data portion comprises:
    converting the data portion from analog to digital form;
    dividing the data signal in digital form into a plurality of desired bins specified by frequency range; and
    discarding data outside the plurality of desired bins.

10. The method of claim 8, wherein modulating the requantized data portion comprises combining a plurality of requantized portions in a plurality of data bins specified by frequency into a digital signal in the time domain and converting the digital signal in the time domain to an analog signal.

11. A system for facilitating greater reach of a DSL signal having a data portion, comprising:
    a means for demodulating the data portion; a means for requantizing the demodulated data portion by determining a constellation associated with each bit of data in the modulated data portion and resetting the value of that bit to the value of the constellation and transform the data portion into a regenerated form;
    a means for modulating the requantized data portion; and
    a means for combining and amplifying the modulated requantized data portion and a voice portion.

12. The system of claim 11, and further comprising a means for transmitting the amplified modulated requantized data portion.

13. A system for facilitating providing greater reach of a DSL signal comprising:
- a means for splitting the DSL signal into separate voice and data signals; a means for demodulating the data signal; a means for requantizing the demodulated data signal by determining a constellation associated with each bit of data in the modulated data signal and resetting the value of that bit to the value of the constellation and transform the data signal into a regenerated form;
- a means for modulating the requantized data signal; and
- a means for combining and amplifying the voice signal and the modulated requantized data signal into a combined signal.

14. A bi-directional DSL repeater and amplifier comprising:
- a first signal detector operable to receive a first incoming DSL signal including a first data signal and a first voice signal and to direct the first incoming DSL signal to a first conditioning circuit and also operable to receive a first outgoing data signal from a second conditioning circuit and direct the first outgoing data signal over a first telephone line;
- the first conditioning circuit being operable to:
- receive a signal indicative of the first incoming DSL signal; demodulate, requantize, and remodulate the first data signal to produce a first remodulated data signal, the first data signal requantized by determining a constellation associated with each bit of data in the modulated first data signal and resetting the value of that bit to the value of the constellation to acquire underlying data in the first data signal and transform the first data signal into a regenerated form; and
- combine and amplify the first remodulated data signal and the first voice signal to produce a second outgoing data signal;
- the second conditioning circuit being operable to:
- receive a signal indicative of a second incoming DSL signal including a second data signal and a second voice signal;
- demodulate, requantize, and remodulate the second data signal to produce a second remodulated data signal, the second data signal requantized by determining a constellation associated with each bit of data in the modulated data signal and resetting the value of that bit to the value of the constellation to acquire underlying data in the second data signal and transform the second data signal into a regenerated form; and
- combine and amplify the second remodulated data signal and the second voice signal to produce the first outgoing data signal; and
- a second signal detector operable to receive the second incoming DSL signal and direct the second incoming DSL signal to the second conditioning circuit and also operable to receive the second outgoing data signal from the first conditioning circuit and direct the second outgoing data signal over a second telephone line.

15. The bi-directional DSL repeater and amplifier of claim 14 wherein the first conditioning circuit comprises a low band filter and a high band filter for filtering the incoming DSL signal into the first voice signal and the first data signal.

16. The bi-directional DSL repeater and amplifier of claim 14, wherein the first conditioning circuit comprises a requantizer for requantizing the first data signal.

17. The bi-directional DSL repeater and amplifier of claim 14, wherein the first conditioning circuit comprises on analog-to-digital converter and a Fast Fourier Transformer for demodulating the first data signal.

18. The bi-directional DSL repeater and amplifier of claim 14, wherein the first conditioning circuit comprises a digital-to-analog converter and an Inverse Fast Fourier Transformer for converting the first data signal into digital format.

19. The bi-directional DSL repeater and a amplifier of claim 14, wherein the first conditioning circuit comprises a data acquirer and re-transmitter for demodulating, requantizing, and remodulating the first data signal.

20. The bi-directional DSL repeater and amplifier of claim 15, wherein the first conditioning circuit comprises a first amplifier for amplifying the first voice signal and a second amplifier for amplifying the first remodulated data signal.

21. The bi-directional DSL repeater and amplifier of claim 14, wherein the first signal detector comprises a resistive hybrid bridge.

* * * * *